(12) United States Patent
Atkins

(10) Patent No.: US 6,310,541 B1
(45) Date of Patent: Oct. 30, 2001

(54) MOTOR VEHICLE RECORDER SYSTEM

(76) Inventor: William T. Atkins, 7283 Pommel Dr., Eldersburg, MD (US) 21784

( * ) Notice: Subject to any disclaimer, the term of this patent is extended or adjusted under 35 U.S.C. 154(b) by 0 days.

(21) Appl. No.: 09/511,277

(22) Filed: Feb. 23, 2000

(51) Int. Cl.[7] .................................................. B60Q 1/00
(52) U.S. Cl. ...................... 340/425.5; 340/540; 348/148; 360/5; 369/21
(58) Field of Search ................................ 340/425.5, 426, 340/540; 348/148; 360/5; 369/21

(56) References Cited

U.S. PATENT DOCUMENTS

| | | | |
|---|---|---|---|
| 5,111,289 | * | 5/1992 | Lucas et al. ........................... 358/108 |
| 5,406,324 | * | 4/1995 | Roth ....................................... 348/22 |
| 5,459,702 | * | 10/1995 | Greenspan ............................. 369/25 |
| 5,771,303 | * | 6/1998 | Mazzarella et al. .................. 381/169 |

* cited by examiner

Primary Examiner—Julie Lieu

(74) Attorney, Agent, or Firm—Roylance, Abrams, Berdo & Goodman, L.L.P.

(57) ABSTRACT

This invention relates to a Motor Vehicle Recorder System device, which consists of a tape recorder and sensitive microphone system installed in an automobile to record a conversation. The invention reveals a mini-tape recorder installed in a motor vehicle with a mini-microphone positioned on the driver's side. This recording system can be activated by either a foot switch or alternatively by voice activation. This Motor Vehicle Recorder System invention also includes activation in several different modes: (1) silent activation, (2) signal activation, (3) compliance activation whereby there is a message announcing that the incident is being recorded, and (4) automatic shut down of all other sound systems in the motor vehicle to allow this invention to function and record without background noise. The system has been designed to protect drivers involved in an accident, car failure, severe weather conditions or any other condition which causes the driver to abandon or leave the motor vehicle, The system has also been designed to protect law-abiding citizens and drivers in any attempted carjacking situations and to discourage police officers from mistreating motorists and displaying unprofessional attitudes.

20 Claims, 3 Drawing Sheets

MOTOR VEHICLE RECORDER SYSTEM

BACKGROUND OF THE INVENTION

1. Field of the Invention

Figure 1:
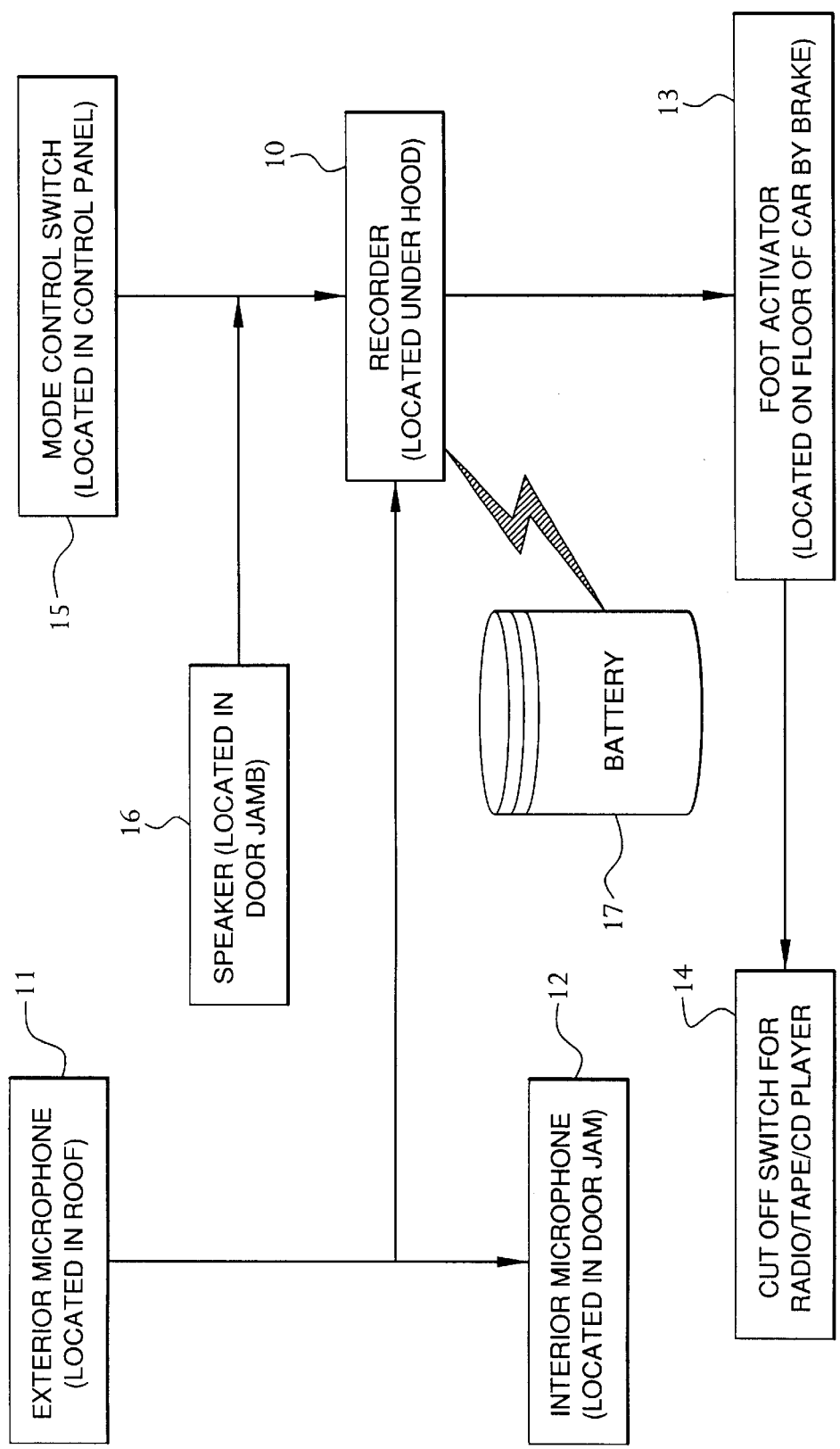
FIG. 1 is a block diagram with a schematic showing an overview of the general components of the preferred embodiment of the foot activated Motor Vehicle Recorder System of this invention.

The present invention relates to motor vehicles and particularly to automobiles and trucks. An objective of the design of this system has been to protect law-abiding citizens and drivers and to discourage police officers from mistreating motorists and displaying unprofessional attitudes. If a driver of a motor vehicle is involved with a car accident, severe weather conditions or any condition which causes the driver or passengers to abandon the motor vehicle, this invention allows a recording of a message and voice record of the event, facts, time, etc. to be conveniently made and preserved in the motor vehicle. If a car jacking is attempted, the driver can similarly record the conversation/criminal demand using this invention without notifying the perpetrator. Further, if a driver is stopped by a police officer, he is often instructed to raise his hands which prevents the driver from picking up any object that would be of potential harm to the Officer or also hand activating any devices inside the motor vehicle. Courts and Administrative officers sometimes fail to recognize troubling situations whereby a motor vehicle driver is stopped, without any passengers in the motor vehicle or any witnesses whatsoever to the stop, only to have reduced credibility with his or her self-serving testimony regarding the display of unprofessional conduct by the police officer who made the stop. Law-abiding citizens and drivers need passive protection to discourage police officers from displaying unprofessional attitudes.

The Motor Vehicle Recorder System of the present invention consists of a mini-tape recorder and a sensitive microphone system installed in an automobile to record conversation. The device prior to activation of the microphones can optionally broadcast a warning message indicating that the conversation will be recorded or a short warning beeper message. This invention also automatically shuts down of all other sound systems in the motor vehicle to allow the device to function and record without background noise.

This invention includes a mini-recorder attached to two sensitive microphones, a speaker and an activation system. The activation system includes a heavy-duty foot button, installed next to the motor vehicle's brake pedal, and which will only be activated when firmly depressed for two seconds. The activation system also includes a switch, which automatically turns off the radio, tape deck, or CD player installed in the motor vehicle in order not to record such background sounds. This activation system also includes a voice activation feature, which permits the entire Motor Vehicle Recorder System to alternatively be activated by the voice command of the driver or passengers. The Motor Vehicle Recorder System also includes a feature, which constantly and silently monitors the speed of the motor vehicle and automatically records a complete log profile on the mini-recorder of the speed of the motor vehicle every 2 seconds for a predetermined programmable time prior to activation of the device.

2. Description of the Prior Art

In the prior art small or mini tape recorders are well known for various applications and uses. U.S. Pat. No. 4,123,016 is such an invention, which discloses a device for adapting a mini tape recorder for transcribing use with a foot control. The patent reveals a mini tape recorder device to which a solenoid means is connected and adapted to actuate the recorder in forward or reverse wind control. The foot control means for this mini tape recorder apparatus is only for use of the mini tape recorder itself by a typist as a transcribing device. This invention does not teach use of such apparatus in a motor vehicle, or control of the mini tape recorder by any type of audio control, nor the alternative combination as in your invention, of either foot pedal control or audio control.

Other types of tape recorder control devices such as U.S. Pat. No. 4,207,440 disclose tape recorders with speech-extendable adjustment predetermined playback time. This patent disclosure shows a tape recorder with a stop-start motor which is controlled by a timer for which the run time and off time can be independently set by the voice of the user. However, this patent does not disclose the unique combination of the control features in the present invention, nor suggest use in a motor vehicle.

U.S. Pat. No. 4,371,750 discloses a microphone and a remote control system with adjustable gain devices. It is a patent for a hand held microphone and remote control system, which does not reveal use in a motor vehicle, nor control of the mini tape recorder by any type of audio control, nor the combination as in your invention, of either foot pedal control or audio control of a microphone and recording system. The claims of this patent focus on a public address system with an amplifier and a speaker coupled with a microphone circuit.

U.S. Pat. No. 4,817,127 is the parent patent of the basic dictating machine. As such, it is a complex patent and addresses the features of the new and improved 1989 Dictaphone dictating machine. Again, this patent is distinct from the present invention as this device does not disclose control of the mini tape recorder by any type of voice/audio control, nor the alternative combination as in the present invention, of either foot pedal control or voice/audio control nor suggest use in a motor vehicle.

U.S. Pat. No. 5,838,393, issued Nov. 17, 1988, discloses a unique audio-switching device, which allows the operator to control the selection of input and output signals. This patent was not focused at mini tape recorders, although the electronic circuitry is similar to the circuitry to activate a recorder by either a foot switch or alternatively control selection by voice activation. This invention does not teach its use for control of tape recorders by any type of voice/audio control, nor the combination as in the present invention, of either foot pedal control or voice/audio control of a microphone and recording system. This disclosure does not reveal use of the control device in a motor vehicle, and it is distinct from this invention.

U.S. Pat. No. 4,221,359 further adds to the control field in that it reveals a simple hydraulic valve, which is operated by a foot pedal control device. This patent discloses the operational details of the now well established fact that the rocking movement of the foot pedal can control a device such as the valve in that invention as it turns actuates the hydraulic feature of the valve. This disclosure is relevant to the foot control mechanism of the mini tape recorder invention, but it is distinct from the present invention.

DETAILED DESCRIPTION

Referring to the drawings for a better understanding of the present invention, this invention is susceptible to embodiment in several different forms. The description which follows should be viewed as an illustration of the principles of the invention and is not intended to limit this invention to the embodiments illustrated in the drawings herein.

FIG. 1 shows a block diagram of the general electrical wiring schematic showing an overview of the preferred embodiment of the foot activated recorder of this invention. The Mini Tape Recorder 10 is installed on the firewall panel under the hood of the vehicle as a self Controlled and weather protected component which is connected to the Mode Control Switch 15 which has four separate control mode positions: (1) Off position, (2) Silent position, (3) Signal position, and (4) Compliance position. The Mode Control Switch 15 is electrically interconnected to the motor vehicle's Power source/Battery 17 and to the Foot Activator 13 located on the floor of the vehicle near the brake pedal. Whenever the Mode Control Switch 15 is in the "Off Position", the Foot Activated Control (FAC) or Voice Activated Control (VAC) remains turned off and can not be activated until Mode Control Switch 15 (FIG. 1) or optional Mode Control Switch 25 (FIG. 2) for the optional voice activated feature has been turned to one of the three other positions. If Mode Control Switch 15 or optional Mode Control Switch 25 (FIG. 2) for the optional voice activated feature has been turned to one of the three other positions and either the Foot Activator Button 13 is engaged for two seconds or more, or alternatively Voice Activated Control 23 (As shown in FIG. 2) is activated by voice command of the driver or passenger, the Motor Vehicle recorder system is "live" and functions as described herein.

Figure 2:
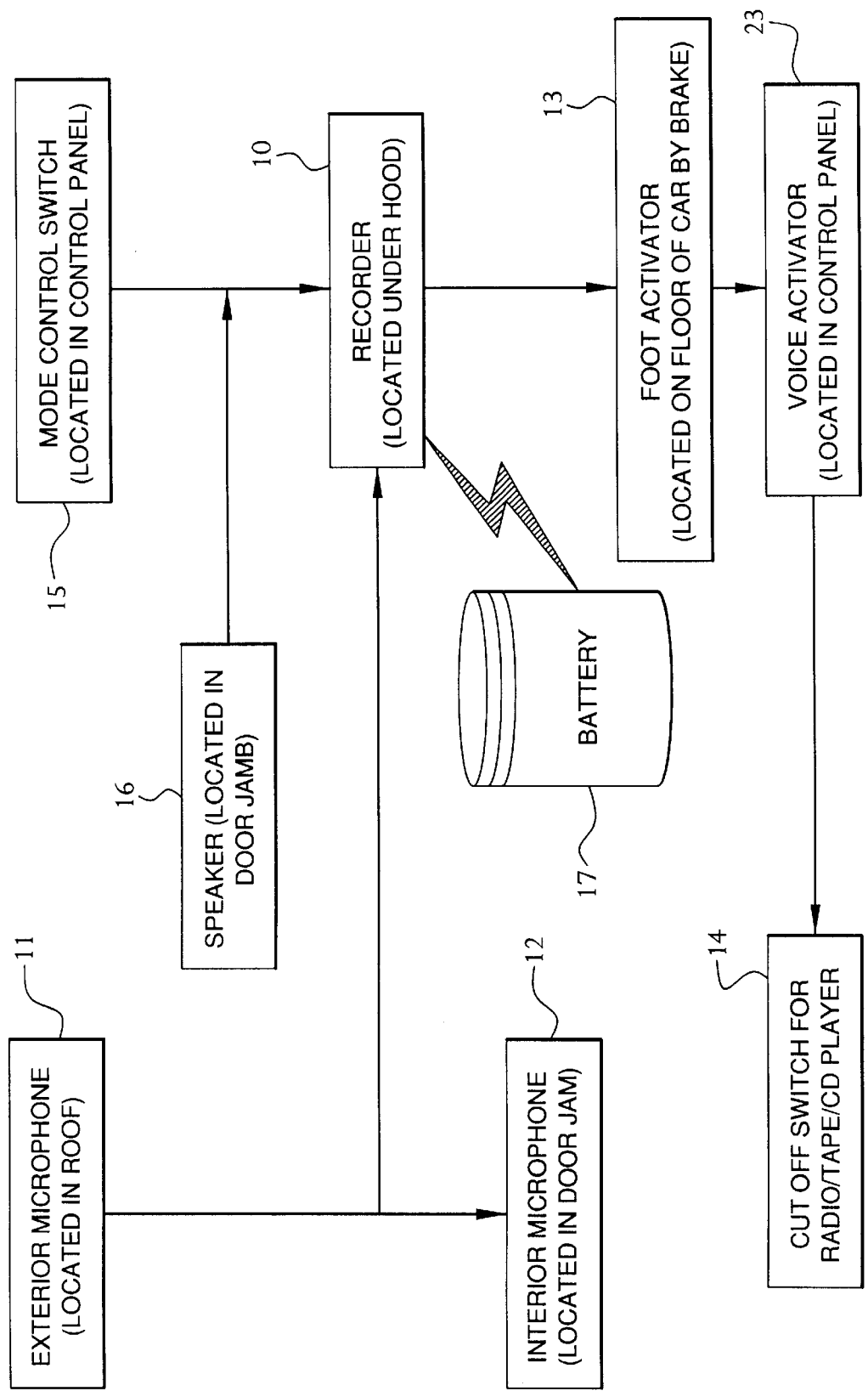
FIG. 2 is a block diagram with a schematic showing an overview of the general components of the optional embodiment of a voice activated and foot activated Motor Vehicle Recorder System of this invention.

The alternative configuration of the Foot Activated Control (FAC) is the optional Voice Activated (VAC) Control feature depicted in FIG. 2, where Mode Control Switch 15 has replaced with (VAC) Mode Control Switch 25 and the Voice Activation Module 23 is added to the basic system. Thus, Voice Activation Module 23 permits the Motor Vehicle Recorder System to be turned on by either engaging Foot Activator Button 13 for two or more seconds or by voice command of the driver or passengers through the use of the Voice Activation Module 23. Activation of the Motor Vehicle Recorder System, when Mode Control Switch 15 or optional Mode Control Switch 25 is turned the Silent position, results in the Cutoff switch 14 automatically turning off the motor vehicle's electrical power source for the radio, and/or tape recorder and/or CD player to allow the Motor Vehicle Recorder system to function without background noise. Recorder device 10 functions first as a mini-tape recorder and records the sounds picked up from interior mounted microphone 12 or exterior mounted microphone 13. Recorder 10 also functions to monitor the motor vehicle speed at all times and is programmed to automatically record the speed of the vehicle on the tape Recorder 10 as a complete log profile of the speed of the motor vehicle every 2 seconds for a programmable time prior to activation of microphones 12 and 13 and the recording function.

Activation of the Motor Vehicle Recorder System, when turned to the Signal Position of Mode Control Switch 15 or optional Mode Control Switch 25, results in an emission function by Recorder 10, through speaker 16 with a short intermittent warning beeping signal for a limited period of time prior to activation of interior mounted microphone 12 or exterior mounted microphone 13 and the recording function of Recorder 10. The Recorder device 10 again functions as a mini-tape recorder and records the sounds picked up from interior mounted microphone 12 or exterior mounted microphone 13. Recorder 10 functions as a monitor of the motor vehicle's speed and is programmed to automatically record the speed of the vehicle on the tape in Recorder 10 as a complete log profile of the speed of the motor vehicle every 2 seconds for a programmable time prior to activation of microphones 12 and 13 and the recording function.

Activation of the Motor Vehicle Recorder System, when turned to the Compliance position of Mode Control Switch 15 or optional Mode Control Switch 25, results in Recorder 10 playing a warning notification through speaker 16 that the incident is about to be recorded. The Recorder device 10 again then functions as a recorder and records all the sounds picked up from interior mounted microphone 12 or exterior mounted microphone 13. Recorder 10 functions as outlined above as a monitor of the motor vehicle's speed and is programmed to automatically record the speed of the vehicle on the tape in Recorder for a programmable time prior to activation of microphones 12 and 13 and the recording function.

Figure 3:
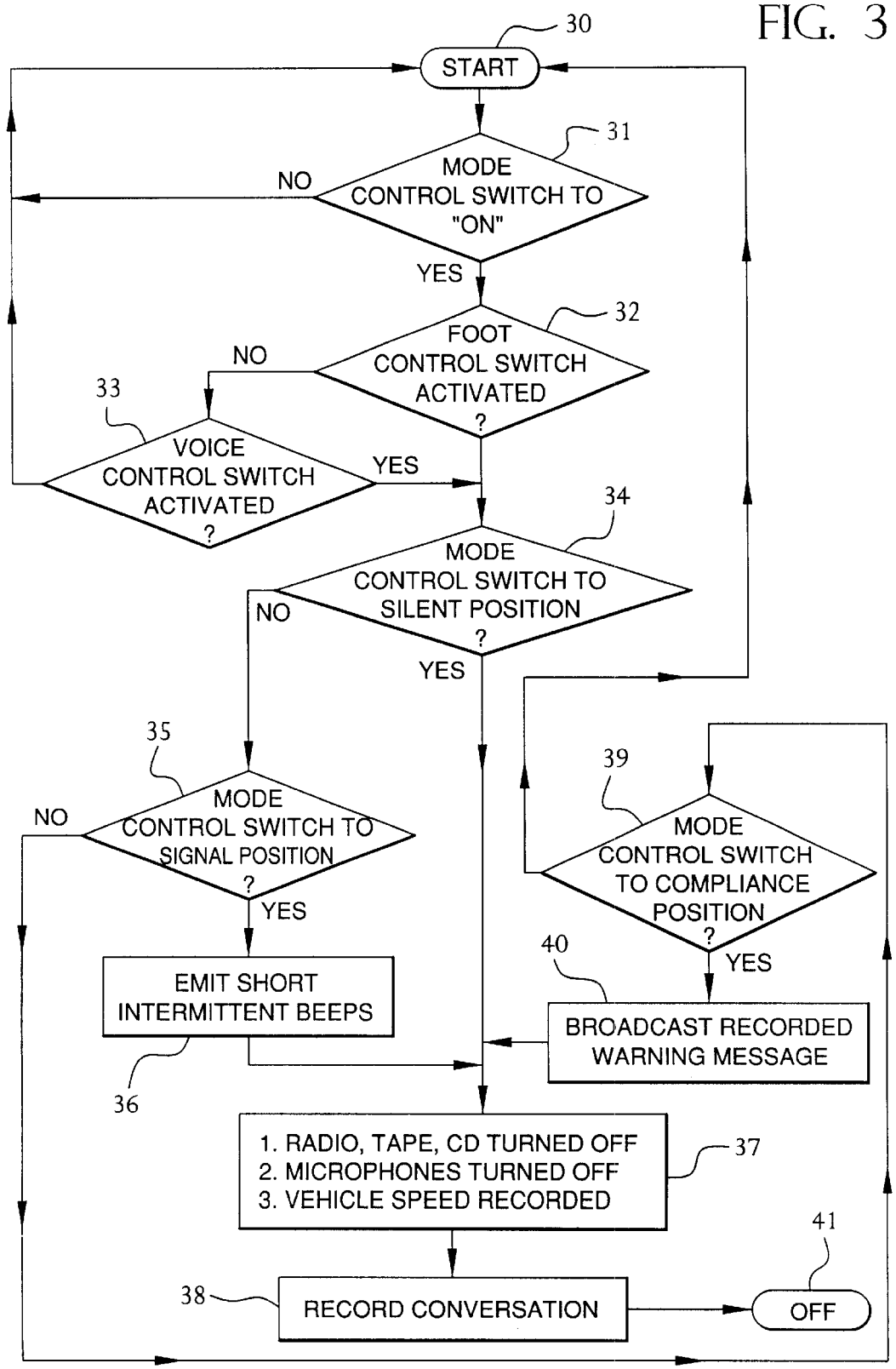
FIG. 3 is a flow chart with a schematic depicting internal system logic of the Motor Vehicle Recorder System of this invention.

FIG. 3 is explained in more fully in detail as follows. The motor vehicle itself must first be turned on through its own key ignition system. As observed in FIG. 3, the Motor Vehicle Recorder System (MVRS) start 30 by turning the Mode switch to the selected mode by the driver from the "Off" position 31. The MVRS is activated by the driver depressing the foot activation button/switch 32 next to the brake pedal. If the MVRS is equipped with the optional voice activation feature, the driver could alternatively select to activate the MVRS by voice command 33.

As seen in FIG. 3, if the Mode Switch is set on the "Silent" position 34, the MVRS then turns off the power supply to the vehicle's radio and/or tape player and/or CD player; turns on the two MVRS microphones; and records the vehicle's speed on the tape in Recorder 10 for a programmable time prior to activation of microphones 12 and 13 on the recorder function 37. The MVRS then records the conversation 38 picked up by the two MVRS microphones until the system is turned "Off" 41 by turning the Mode Switch to "Off" or through the vehicle's own key ignition system.

In FIG. 3, if the Mode Switch is set on the "Signal" position 35, the MVRS then emits short intermittent beeps audible to the driver 36; then turns off the power supply to the vehicle's radio and/or tape player and/or CD player; turns on the two MVRS microphones; and the vehicle's speed at a predetermined time prior to activation of microphones is automatically recorded on the recorder 37. The MVRS then records the conversation 38 picked up by the two MVRS microphones until the system is turned "Off" 41 by turning the Mode Switch to "Off" or through the vehicle's key ignition system.

In FIG. 3, if the Mode Switch is set on the "Compliance" position 39, the MVRS then broadcast a prerecorded warning message advising all that the conversation will be recorded 40; then turns off the power supply to the vehicle's radio and/or tape player and/or CD player; turns on the two MVRS microphones; and records the vehicle's speed on the tape in Recorder 10 for a programmable time prior to activation of microphones 12 and 13 on the recorder function 37. The MVRS then records the conversation 38 picked up by the two MVRS microphones until the system is turned "Off" 41 by turning the Mode Switch to "Off" or through the vehicle's own key ignition system.

SUMMARY OF THE INVENTION

In accordance with this invention, the Motor Vehicle Recorder System consists of a mini-tape recorder and a sensitive microphone system installed in an automobile to record conversation. A warning message indicating that the conversation will be recorded or a short warning beeper message can optionally be broadcast by the recorder through the speaker prior to activation of the microphones.

This invention includes a recorder electrically attached to two sensitive microphones, a speaker and an activation system. The activation system includes a heavy-duty foot button, and which is activated when firmly depressed for two seconds. The activation system also includes a switch, which automatically turns off the radio, tape deck, or CD player installed in the motor vehicle and record without background noise. The activation system also includes a voice activation feature, which permits the Motor Vehicle Recorder System to alternatively be activated by the voice command of the driver or passengers. The invention also includes a feature, which constantly and silently monitors the speed of the motor vehicle and automatically records on the recorder the speed profile of the motor vehicle for a predetermined and programmable time prior to activation.

Although only a few exemplary embodiments of the present invention have been described in detail above, those skilled in the art will readily appreciate that many modifications and substitutions are possible in the exemplary embodiments without materially departing from the novel teachings and advantages of the invention. Accordingly, all such modifications and substitutions are intended to be included within the scope of the invention as defined in the following claims.

What is claimed is:

1. A motor vehicle recorder system which monitors the speed of the vehicle and also records sound the motor vehicle comprising:

a tape recorder device capable of recording the speed of the vehicle as well as recording sound, two or more microphones connected to said recorder device, one or more speakers connected to said recorder device, a multiple position mode function control switch connected to said recorder device, a foot activation control switch connected to said recorder device, a cut-off switch connected to said recorder device for simultaneously turning off the motor vehicle radio and tape player and CD player prior to activation of said microphones.

2. A motor vehicle recorder system as in claim 1, in which an optional voice activation device is added to the system and is connected to said recorder device which permits voice activation of the said system.

3. A motor vehicle recorder system as in claim 2, in which the said multiple position mode function control switch includes :the "OFF", "Silent", "Signal" and "Compliance" functions position.

4. A motor vehicle recorder system as in claim 3, in which the said multiple position mode function control switch includes: the "Silent" function position controls recording the vehicle speed at programmable intervals and at a programmable time prior to time prior to activation of the system, activation of the said recorder, microphones, speaker, and the said cut-off switch.

5. A motor vehicle recorder system as in claim 3, in which the said multiple position mode function control switch includes: the "Signal" function position controls recording the vehicle speed at programmable intervals and at a programmable time prior to time prior to activation of the system, activation of the said recorder, microphones, speaker, emission of an intermittent beep sound by the recorder device, and the said cut-off switch.

6. A motor vehicle recorder system as in claim 3, in which the said multiple position mode function control switch includes: the "Compliance" function position controls recording the vehicle speed at programmable intervals and at a programmable time prior to time prior to activation of the system, activation of the said recorder, microphones, speaker, broadcast through the said speaker from the recorder device of a prerecorded warning message that a recording will be made of the incident, and the said cut-off switch.

7. A motor vehicle recorder system as in claim 3, in which the tape recorder device includes the capability to record the vehicle speed at intermittent time intervals and to record at a programmable time prior to activation of the system and which said intervals can be programmed by adjusting the designated variable settings of the said recorder device.

8. A motor vehicle recorder system which constantly monitors, records the speed of the vehicle at programmable intervals and at a programmable time prior to time prior to activation of the system, and also records sound outside the motor vehicle comprising:

a tape recorder device capable of monitoring and recording the speed of the vehicle as well as recording sound and conversation, two or more microphones connected to said recorder device, one or more speakers connected to said recorder device, a multiple position mode function control switch connected to said recorder device, a foot activation control switch connected to said recorder device, a cut-off switch connected to said recorder device for simultaneously turning off the motor vehicle radio and tape player and CD player prior to activation of said microphones.

9. A motor vehicle recorder system as in claim 8, in which an optional voice activation device is added to the system and is connected to said recorder device which permits voice activation of the said system.

10. A motor vehicle recorder system as in claim 9, in which the said multiple position mode function control switch includes :the "OFF", "Silent", "Signal" and "Compliance" functions position.

11. A motor vehicle recorder system as in claim 10, in which the said multiple position mode function control switch includes: a "Silent" function position which controls recording the vehicle speed at programmable intervals and at a programmable time prior to time prior to activation of the system, activation of the said recorder, microphones, speaker, and the said cut-off switch.

12. A motor vehicle recorder system as in claim 10, in which the said multiple position mode function control switch includes: a "Signal" function position controls recording the vehicle speed at programmable intervals and at a programmable time prior to time prior to activation of the system, activation of the said recorder, microphones, speaker, emission of an intermittent beep sound by the recorder device, and the said cut-off switch.

13. A motor vehicle recorder system as in claim 10, in which the said multiple position mode function control switch includes: a "Compliance" function position which controls recording the vehicle speed at programmable intervals and at a programmable time prior to time prior to activation of the system, activation of the said recorder, microphones, speaker, broadcast through the said speaker from the recorder device of a prerecorded warning message that a recording will be made of the incident, and the said cut-off switch.

14. A motor vehicle recorder system as in claim 10, in which the tape recorder device includes the capability to silently and continuously monitor as well as to record the vehicle speed at intermittent time intervals and to record at a programmable time prior to activation of the system and which said intervals can be programmed by adjusting the designated variable settings of the said recorder device.

15. A method of constantly and accurately recording in a motor vehicle the speed of the vehicle at programmable intervals and at a programmable time prior to time prior to activation of the recording system, and a method which also records sound outside the motor vehicle comprising:

a tape recorder device which monitors and records the speed of the vehicle as well as records sound, two or more microphones connected to said recorder device, one or more speakers connected to said recorder device, a multiple position mode function control switch connected to said recorder device, a foot activation control switch connected to said recorder device, a cut-off switch connected to said recorder device for simultaneously turning off the motor vehicle radio and tape player and CD player prior to activation of said microphones.

16. A method of constantly monitoring and accurately recording in a motor vehicle as in claim 15, in which an optional voice activation device is added and is connected to said recorder device providing voice activation control of the said system.

17. A method of constantly monitoring and accurately recording in a motor vehicle as in claim 16, in which the said multiple position mode function control switch includes :the "OFF", "Silent", "Signal" and "Compliance" functions position.

18. A method of constantly monitoring and accurately recording in a motor vehicle as in claim 16, in which the said multiple position mode function control switch includes: a "Silent" function position which controls recording the vehicle speed at programmable intervals and at a programmable time prior to time prior to activation of the system, activation of the said recorder, microphones, speaker, and the said cut-off switch.

19. A motor vehicle recorder system as in claim 16, in which the said multiple position mode function control switch includes: a "Signal" function position which controls recording the vehicle speed at programmable intervals and at a programmable time prior to time prior to activation of the system, activation of the said recorder, microphones, speaker, emission of an intermittent beep sound by the recorder device, and the said cut-off switch.

20. A motor vehicle recorder system as in claim 16, in which the said multiple position mode function control switch includes: a "Compliance" function position which controls recording the vehicle speed at programmable intervals and at a programmable time prior to time prior to activation of the system, activation of the said recorder, microphones, speaker, broadcast through the said speaker from the recorder device of a prerecorded warning message that a recording will be made of the incident, and the said cut-off switch.

* * * * *